US012412918B2

(12) United States Patent
Biswas et al.

(10) Patent No.: US 12,412,918 B2
(45) Date of Patent: Sep. 9, 2025

(54) INSPECTION OF BINDERS AND SLURRY MIXTURES FOR USE IN BATTERY FABRICATION BASED ON ACOUSTIC SIGNAL ANALYSIS

(71) Applicant: LIMINAL INSIGHTS, INC., Emeryville, CA (US)

(72) Inventors: Shaurjo Biswas, El Cerrito, CA (US); Andrew Hsieh, Berkeley, CA (US); Barry Van Tassell, El Cerrito, CA (US); Marc Juzkow, Livermore, CA (US)

(73) Assignee: LIMINAL INSIGHTS, INC., Emeryville, CA (US)

( * ) Notice: Subject to any disclaimer, the term of this patent is extended or adjusted under 35 U.S.C. 154(b) by 598 days.

(21) Appl. No.: 17/455,366

(22) Filed: Nov. 17, 2021

(65) Prior Publication Data

US 2022/0155262 A1 May 19, 2022

Related U.S. Application Data

(60) Provisional application No. 63/115,562, filed on Nov. 18, 2020.

(51) Int. Cl.
*H01M 10/00* (2006.01)
*G01N 29/44* (2006.01)
*H01M 4/04* (2006.01)
*H01M 10/04* (2006.01)

(52) U.S. Cl.
CPC ........ *H01M 10/0404* (2013.01); *G01N 29/44* (2013.01); *H01M 4/0404* (2013.01); *H01M 4/0471* (2013.01); *H01M 10/04* (2013.01); *G01N 2291/024* (2013.01);
(Continued)

(58) Field of Classification Search
CPC ......... G01N 29/44; H01M 10/04; H01M 4/04
See application file for complete search history.

(56) References Cited

U.S. PATENT DOCUMENTS

2018/0294459 A1\* 10/2018 Yamada ............... B32B 27/308
2020/0358147 A1\* 11/2020 Dou .................... H01M 10/446

FOREIGN PATENT DOCUMENTS

JP   2010 181290 A   8/2010
JP   2017 045547 A   3/2017

OTHER PUBLICATIONS

International Search Report, PCT application # PCT/US2021/072472, dated Jun. 24, 2022.

\* cited by examiner

*Primary Examiner* — Niki Bakhtiari
*Assistant Examiner* — Monique M Wills
(74) *Attorney, Agent, or Firm* — Polsinelli PC

(57) ABSTRACT

Systems, techniques, and computer-implemented processes for acoustic signal based improvements to one or more process steps in the manufacture of battery cells. Information gathered based on an acoustic signal based analysis in one process step can be used in one or more other process steps using any suitable combination of feedback and/or feedforward of the acoustic signal based analysis. Such feedback and/or feedforward can improve the overall quality of battery cells produced using the manufacturing process, efficiency/cost of the manufacturing process, improvement in yield/reduction in wastage of the battery cells produced using the manufacturing process and/or improvements in individual process steps.

16 Claims, 6 Drawing Sheets

(52) U.S. Cl.
CPC ........ *G01N 2291/101* (2013.01); *Y02E 60/10* (2013.01); *Y02P 70/50* (2015.11)

```
┌─────────────────────────────────────────────────────────┐
│  PERFORM ACOUSTIC SIGNAL BASED ANALYSIS DURING A FIRST  │
│  PROCESS STEP FOR MANUFACTURING ONE OR MORE BATTERY CELLS│
│               OR COMPONENTS THEREOF                      │
│                        502                               │
└─────────────────────────────────────────────────────────┘
                           │
                           ▼
┌─────────────────────────────────────────────────────────┐
│  BASED ON THE ACOUSTIC SIGNAL BASED ANALYSIS PERFORMED  │
│  DURING THE FIRST PROCESS STEP, DETERMINE ONE OR MORE   │
│  IMPROVEMENTS TO AT LEAST ONE OF THE FIRST PROCESS STEP AND │
│  A SECOND PROCESS STEP FOR MANUFACTURING THE ONE OR MORE│
│           BATTERY CELLS OR COMPONENTS THEREOF            │
│                        504                               │
└─────────────────────────────────────────────────────────┘
                           │
                           ▼
┌─────────────────────────────────────────────────────────┐
│  FEED INFORMATION REGARDING THE ONE OR MORE IMPROVEMENTS│
│  TO THE AT LEAST ONE OF THE FIRST PROCESS STEP AND THE SECOND │
│                    PROCESS STEP                          │
│                        506                               │
└─────────────────────────────────────────────────────────┘
```

FIG. 5

FIG. 6

INSPECTION OF BINDERS AND SLURRY MIXTURES FOR USE IN BATTERY FABRICATION BASED ON ACOUSTIC SIGNAL ANALYSIS

CROSS REFERENCE TO RELATED APPLICATIONS

This application claims the benefit of U.S. Provisional Application No. 63/115,562, filed on Nov. 18, 2020, and entitled "INSPECTION OF BINDERS AND SLURRY MIXTURES FOR USE IN BATTERY FABRICATION BASED ON ACOUSTIC SIGNAL ANALYSIS", the contents of which are hereby incorporated by reference in their entirety and for all purposes.

FIELD OF DISCLOSURE

Disclosed aspects are directed to monitoring, inspection, and manufacturing process improvements of solid-liquid mixtures, binders, slurries, and other materials, based on acoustic signals. More specifically, exemplary aspects are directed to acoustic signal based analysis of dry solid powders, solid-liquid mixtures, and slurries used in the fabrication of electrodes and other components of battery cells and electrochemical storage devices.

BACKGROUND

Demands on production of battery cells are on the rise owing to an increase in demand for battery cells from various industries such as consumer electronics, automotive, clean energy, etc. Efficient and fast battery diagnostics methods are important for increasing quality, lifetime, and manufacturing process efficiency for batteries. In the case of manufacturing and production, reducing costs (e.g., price per kilo Watt hour (kWh)) is an important goal. Production costs and quality can be reduced by optimizing existing processes and/or introducing new technologies. For example, technological advances in the area of improved monitoring, manufacturing, and diagnostics can lead to cost efficiencies by shortening production process times (thus also reducing energy consumption during production), reducing wastage due to damaged cells and cell parts, improving quality, etc.

BRIEF DESCRIPTION OF THE DRAWINGS

The accompanying drawings are presented to aid in the description of various aspects of the disclosure and are provided solely for illustration and not limitation.

DETAILED DESCRIPTION

Certain aspects and embodiments of this disclosure are provided in the following description and related drawings. Alternate aspects may be devised without departing from the scope of the disclosure. Additionally, well-known elements of the disclosure will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Demands on production of battery cells are on the rise owing to an increase in demand for battery cells from various industries such as consumer electronics, automotive, clean energy, etc. Efficient and fast inspection methods are important for increasing quality, lifetime, and manufacturing process efficiency for batteries. In the case of manufacturing and production, reducing costs (e.g., price per kilo Watt hour (kWh)) is an important goal. Production costs can be reduced by optimizing and improving existing processes and/or introducing new materials or technologies. For example, technological advances in the area of improved monitoring, manufacturing, and diagnostics can lead to cost efficiencies both by shortening production process times (thus also reducing energy consumption during production) and by reducing wastage due to damaged cells and cell components.

However, there is a lack of known approaches for fast, non-destructive, and inexpensive monitoring methods to monitor battery cell components and cells as they are processed through various stages cell fabrication and manufacturing at scale. The lack of effective monitoring during the production processes leads to low yield, poor quality, and inefficient resource utilization.

In example aspects of this disclosure, systems, techniques, and computer-implemented processes are disclosed for acoustic signal based analysis of solid-liquid mixtures, electrode slurries, binder mixtures, and other components of batteries. For example, data analytics on signals obtained by ultrasound excitation of materials is used to analyze electrode slurry parameters including slurry density, trapped air content, viscosity, and uniformity of mixture. In some examples, using the disclosed techniques in battery manufacturing and production can lead to reduction in wastage of damaged/scrapped battery cells and shorten production time.

Disclosed platforms can use ultrasound and signal processing to assess the physical properties of battery cells and components thereof in a non-invasive, efficient, and streamlined approach while overcoming the drawback of conventional technologies such as optical imaging, thickness profilometry, thermal imaging, X-ray based methods, teardown analysis, etc.

Figure 1:
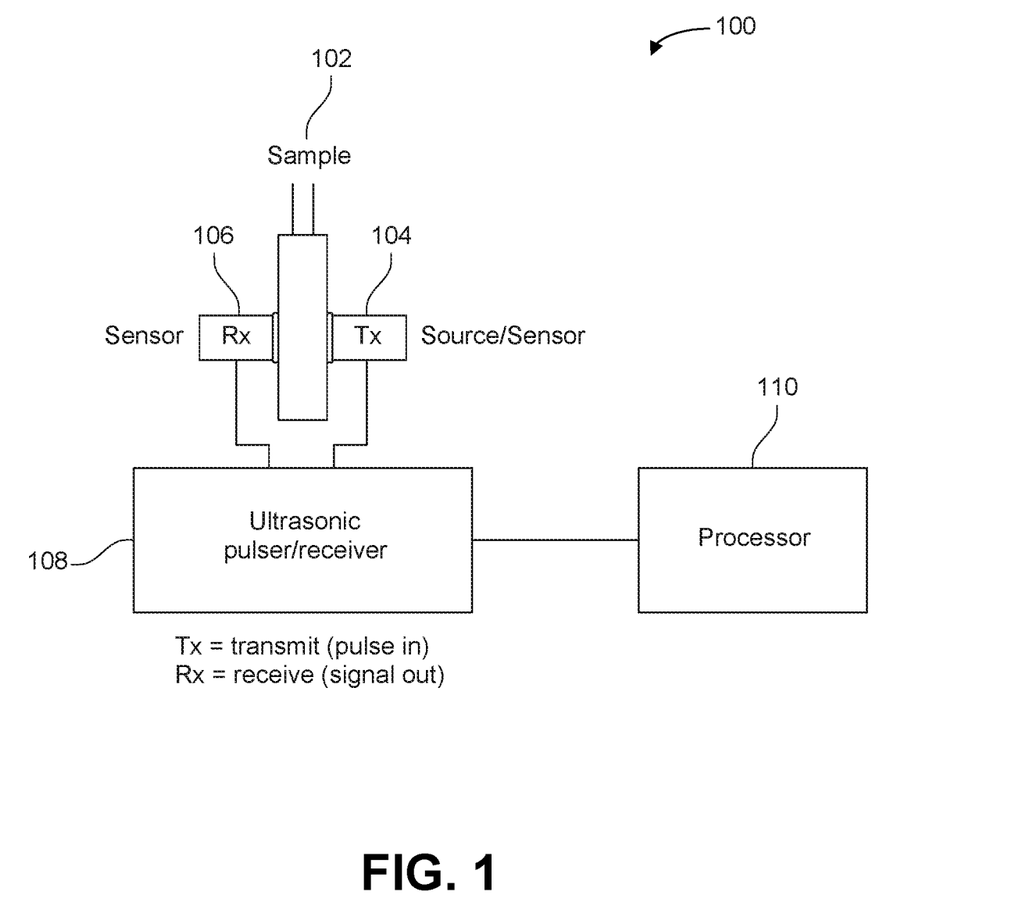
FIG. 1 illustrates an apparatus for acoustic signal based analysis of a sample, according to aspects of this disclosure.

FIG. 1 illustrates an example system 100 for analyzing a sample 102 using acoustic signal based analysis, according to some examples of the disclosure. The sample 102 can include a battery cell or component thereof in any stage of production or manufacture of the battery cell or the individual components. Example production stages and components involved therein will be described with reference to FIG. 2 in more detail. In some examples, the sample 102 can include a battery cell, electrolytes in various stages of wetting/distribution through a battery cell, one or more electrodes of the battery cell, thin films, separators, coated sheets, current collectors, electrode slurries, or materials for forming any of the above components during any stage of their formation. The system 100 can include a transmitting transducer Tx 104 or other means for sending excitation sound signals into the battery cell (e.g., for transmitting a pulse or pulses of ultrasonic or other acoustic waves, vibrations, resonance measurements, etc., through the battery cell). The system 100 can further include a receiving transducer Rx 106 or other means for receiving/sensing the sound signals, which can receive response signals generated from signals transmitted by the Tx transducer 104. The transmitted signals from the Tx transducer 104, from one side of the sample 102 on which the Tx transducer 104 is located, may include input excitation signals. Reflected signals, e.g., from another side of the sample 102, may include echo signals. It is understood that references to response signals may include both the input excitation signals and the echo signals. Further, the Tx transducer 104 may also be configured to receive response signals, and similarly, the Rx transducer 106 may also be configured to transmit acoustic signals. Therefore, even though separately illustrated as Tx and Rx, the functionalities of these transducers may be for both sending and receiving acoustic signals. In various alternatives, even if not specifically illustrated, one or more Tx transducers and one or more Rx transducers can be placed on the same side or wall of the sample 102, or on different (e.g., opposite) sides.

An acoustic pulser/receiver 108 can be coupled to the Tx and Rx transducers 104, 106 for controlling the transmission of acoustic signals (e.g., ultrasound signals) and receiving response signals. The acoustic pulser/receiver 108 may include a controller (not separately illustrated here) for adjusting the amplitude, frequency, and/or other signal features of the transmitted signals. The acoustic pulser/receiver 108 may also receive the signals from the Rx transducers 106. In some examples, the acoustic pulser/receiver 108 may be configured as a combined unit, while in some examples, an acoustic pulser for transmitting excitation signals through the Tx transducer 104 can be a separate unit in communication with a receiver for receiving the signals from the Rx transducer 106. A processor 110 in communication with the acoustic pulser/receiver 108 may be configured to store and analyze the response signal waveforms according to this disclosure. Although representatively shown as a single processor, the processor 110 can include one or more processors, including remote processors, cloud computing infrastructure, etc.

Although not explicitly shown in FIG. 1, more than one Tx transducer and/or more than one Rx transducer can be placed in one or more spatial locations across the sample 102. This allows studying a spatial variation of acoustic signal features across the sample 102. A multiplexer can be configured in communication with the acoustic pulser/receiver 108 for separating and channeling the excitation signals to be transmitted and the response signals received. In some examples, various acoustic couplants can be used (e.g., solid, liquid, or combinations thereof) for making or enhancing contact between the Tx and Rx transducers 104, 106 and the sample 102. Furthermore, various attachment or fixturing mechanisms (e.g., pneumatic, compression, screws, etc.) can also be used for establishing or enhancing the contact between the Tx and Rx transducers 104, 106 and the sample 102.

Figure 2:
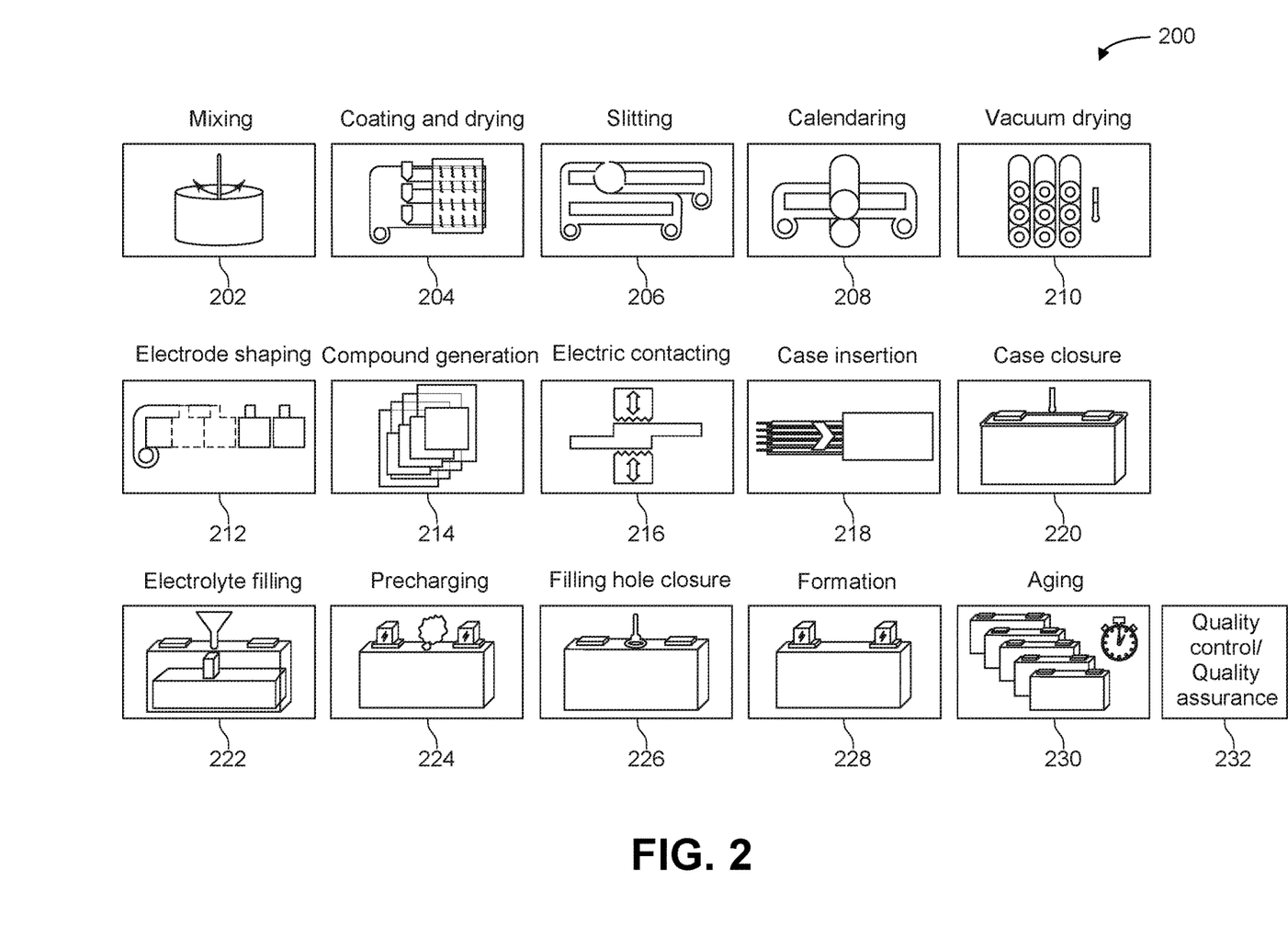
FIG. 2 illustrates example process steps involved in the manufacturing of battery cells, according to aspects of this disclosure.

FIG. 2 illustrates an example production or manufacturing process 200 of one or more battery cells, with various stages or process steps 202 to 232 involved in the manufacturing process 200. A process step (e.g., any process step of process steps 202 to 232) can include one step, multiple steps, or a sequence of steps.

In the following description, the process steps 202 to 232 will be referred to in a sequence, where for a particular battery cell's production/manufacture, process steps denoted with larger reference numerals are considered to occur later in time than process steps denoted with smaller reference numerals. For example, production of a battery cell may progress through an ascending order of process steps 202 to 232. Accordingly, a reference to a feedback herein can include information from a later in time process step or a process step with a higher reference numeral being used in an earlier process step or a process step with a lower reference numeral. Similarly, a reference to a feedforward herein can include information from an earlier in time process step or a process step with a lower reference numeral being used in a later process step or a process step with a higher reference numeral. In various aspects of this disclosure, information gathered based on an acoustic signal based analysis (e.g., conducted using a setup such as system 100) in one process step can be used in one or more other process steps using any suitable combination of feedback and/or feedforward of the acoustic signal based analysis. Such feedback and/or feedforward can improve the overall quality of battery cells produced using the manufacturing process 200, efficiency/cost of the manufacturing process 200, improvement in yield/reduction in wastage of the battery cells produced using the manufacturing process 200, as well as contribute to improvements in various process steps 202 to 232.

In more detail, the manufacturing process 200 can start with a process step 202 for mixing an electrode slurry. In some examples of manufacturing batteries such as lithium ion batteries, active electrode materials such as active anode or cathode electrode materials are mixed with binder and conductive materials in solvents to form a slurry, which is then coated or spread on a web or sheet of metallic current collector sheet, which upon being baked and dried yields the electrodes used in the batteries. Coating the slurry uniformly on the metallic current collector can be a significant factor in proper functioning and longevity of the batteries. Since the slurry is highly viscous and contains a large amount of solid particles and liquid components of varying densities, obtaining uniformly mixed slurry for consistency in coating is a complex and challenging process. As a result, electrode coatings may show significant differences in composition along and across the current collector web. Detecting composition differences and accordingly fabricating batteries with more evenly distributed electrode coatings can lead to increased battery performance and lifetime. Thus, it is noted that improvements in the process step 202 for mixing the slurry can have significant impact on the various subsequent process steps as well as the overall quality of the resulting batteries which use the electrodes formed from the slurry.

A process step 204 includes the coating and drying phases mentioned above. For example, the slurry, upon being coated on a metal sheet or current collector is dried. The drying can include a drying oven where the coated material is dried based on the application of heat. Coating the slurry on the metal sheet can be used in the formation of thin-sheet components for use in electrodes, separators, exterior packaging, or other battery components. It is important to catch quality issues to ensure high quality of these thin-sheet components, e.g., avoiding non-uniformity, damages, contaminations, foreign inclusions, coating-substrate debonding, or improper/leaky packaging, etc., during the coating processes to minimize the impact on safety and performance of the batteries. During battery production, in-line monitoring and early capture of these quality issues are desirable for lowering scrap rate, which in turn could dramatically reduce production costs for the LIBs. When acoustic analysis catches these quality issues, the corrective measures can be fed back to prior mixing step 202 and the current coating and drying process step 204, and/or also fed forward to compensate for electrode issues in subsequent steps of cell and components fabrication.

A process step 206 includes slitting, where the coated sheets or films can be slit or diced to suitable dimensions. For example, wider electrode sheets can be coated with slurry to then be sliced or slit into strips of lower width in some examples. A process step 208 includes calendaring, where the coated sheets are compressed to obtain the desired thickness, bulk density, and porosity of the electrodes. Wet and dry, calendared or/and uncalendared electrode coating can be susceptible to defects such as inconsistency in porosity, local density, mass loading, particle agglomeration, and particle size distributions; damages such as voids, streaks, scratches, or cracks; foreign inclusions such as bubbles and contaminant particles (metallic and/or non-metallic); delamination or flaking of electrode coating; debonding between electrode coating and metal current collectors; subsurface variations in porosity or density, etc. While early detection and/or remediation of such defects is desirable, one or more of these defects may not be detectable via optical and other conventional inspections methods.

A process step 210 can include vacuum drying which can be performed on calendared sheets. A process step 212 can include electrode shaping. Accurate electrode shaping is important for jellyroll and/or cut-and-stack type cells. A process step 214 can include compound generation where two or more units of the shaped electrodes can be combined or compounded. This is the process step for assembling the anode, cathode, and separator into a jellyroll or a stack. A process step 216 can include electrical contacting where a compound of two or more electrode units or current collectors can be coupled through welding or other methods to each other and/or to external electrical contacts or tabs. Process steps 218 and 220 are related to insertion of the jellyroll or electrode stack into a pouch or case which are then sealed.

A process step 222 can include electrolyte filling and soaking. A process step 224 includes precharging, where a certain voltage of charging is applied to the battery cell for a certain duration during electrolyte soaking before formation step 228. A process step 226 includes filling hole closure where a hole in the battery's body which is used for electrolyte filling can be closed. A process step 228 includes SEI formation. LIB formation is the process of performing the initial charge/discharge operation on the battery cell. A process step 230 includes aging, where the decay in each battery cell's open circuit voltage is monitored over time (e.g., a self-discharge rate of the battery cell).

A process step 232 includes quality control (QC) and quality assurance (QA), where the DC resistance, AC impedance, charge and/or discharge capacity, and open circuit voltage are monitored electrically. Acoustic signal based analysis can also be performed on the cells at manufacturing step 232 to identify an internal defect(s), such as electrode and separator tears, folds, damage, electrode misalignment, tab misalignment, metal or other foreign particles, poor electrolyte distribution, poor SEI formation and distribution, etc. In addition to defects, acoustic analysis can also be used to estimate the lifetime performance of the cell. This and other information about defects or issues detected during step 232 can be used in a feedback path to the relevant manufacturing process steps to rectify error or improve process yield and cell quality.

In example aspects, the diagnostic technologies can be used to assess battery electrodes slurries and other battery components, as mentioned above. In the case of lithium-ion batteries (LIB), the electrode materials can include a mixture of active materials such as, for example and without limitation, graphite, silicon compounds and alloys, (e.g., for anode), and Lithium Nickel Manganese Cobalt Oxide (NMC), Lithium Nickel Cobalt Aluminum Oxide (NCA), Lithium Cobalt Oxide (LCO) Lithium Iron Phosphate (LFP), Lithium Manganese Spinel Oxide ($LiMn_2O_4$), etc., (for cathode), binders such as Polyvinylidene Fluoride (PVDF), SBR and CMC, and additives such as carbon black, carbon nanotubes or surfactants (e.g., to improve conductivity or stability of the electrodes). These materials are mixed with solvents such as water for anodes and N-Methyl-2-Pyrrolidone (NMP) for cathodes in a process called mixing. A slurry obtained from the mixing is coated on current collectors to form electrodes. Since the slurry is highly viscous, proper coating is a complex and challenging process. As a result, electrode coatings may show significant differences in composition. Detecting composition differences and accordingly fabricating batteries with more homogenous electrodes can lead to increased battery lifetime and reduce aging. Furthermore, a significant proportion (e.g., 75%) of a battery costs can be material costs, which means that reducing wastage in terms of scrapped cells across the production chain can reduce overall battery costs.

The electrodes can be and/or can be configured to be continuous, homogeneous and of uniform thickness (or significantly continuous, significantly homogeneous, and of significantly uniform thickness). The coating method and the slurry properties are example factors playing a role on process efficiency. Appropriate slurry rheological characteristics, density, porosity, viscosity, adhesion can be optimized and monitored. The coating process can result in and/or can be designed to result in layers with very homogeneous thickness and density distribution as many heterogeneities in the layer might result in undesired local aging of the electrode or poor cycle performance.

An efficient monitoring of electrode and slurry parameters are used in order to evaluate the process and to detect possible defects in the early stage of the production. An efficient method can have a resolution of a few micrometers to assure complete defect detection and a large visual field to match up the industrial scale. Optical microscopy, beta transmission, infrared radiation and laser caliper can be applied during industrial electrode manufacturing. The technologies disclosed herein can enable an in-situ binder mix and slurry monitoring method at-scale.

Binder dissolution, inconsistent solids percentage, agglomeration, slurry gelling, trapped air bubbles, and density fluctuation in binder and electrode slurry can result in thickness heterogeneity, pinholes, divots and agglomerates in the electrodes, which are not easily identified during the slurry and electrode coating process currently. In addition, x-ray methods and beta transmission measurements are expensive and environmentally hazardous (due to ionizing radiation). It requires radioactive sources, which necessitates specialized shielding, services and high levels of security. There is a need for efficient and low cost inspection methods in battery fabrication and process quality control.

Figure 3:
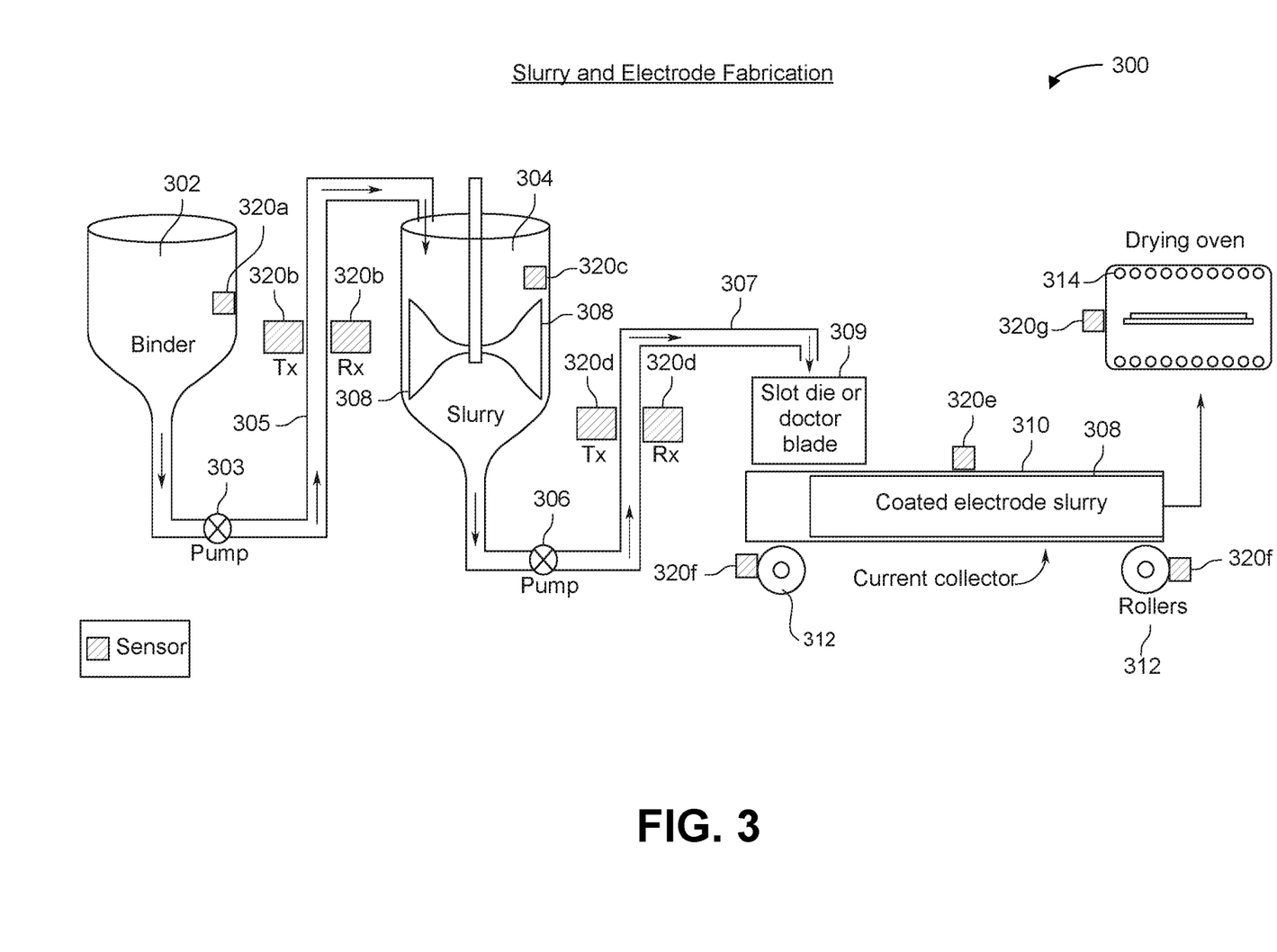
FIG. 3 illustrates the use of acoustic signal based analysis in monitoring slurry mixing, coating, and drying process steps involved in the manufacturing of battery electrodes and cells, according to aspects of this disclosure.

With reference now to FIG. 3, some examples of improving one or more of the process steps of a battery manufacturing process (such as the manufacturing process 200 or other manufacturing process) will be described. While the following examples illustrate the utilization of acoustic inspection techniques with reference to slurry and electrode coating process steps of a manufacturing process, it will be understood that the techniques can be extended to improvement of other process steps.

FIG. 3 illustrates a binder tank 302 which includes a binder. The binder can be any binder or other material used in the preparation of the slurry for electrode coating as discussed above. The binder tank 302 can be attached to a pipe 305 which feeds the binder into a mixer 304 for mixing the slurry. A pump 303 can control a flow rate of the binder through the pipe 305 and into the slurry tank (e.g., mixer 304). In some examples, the flow rate can affect the quality of measurements/data obtained.

A device 320a is representatively shown as being coupled to the binder tank 302. The device 320a can be placed within the binder tank 302 or outside of the binder tank 302. The device 320a can include any arrangement of Tx and/or Rx transducers for acoustic signal based analysis of the binder. For example, even though the device 320a is identified as being coupled on one side or at a specific location of the binder tank 302, this is merely for the sake of illustration, and in example implementations, the device 320a can include one or more Tx and/or Rx transducers (or other suitable devices for acoustic signal based analysis) distributed in any manner in/around the binder tank 302. The device 320a can be used for monitoring various aspects of the binder, such as homogeneity, solid particles (e.g., percentage of solids), uniformity of mixture, consistency, etc.

One or more devices 320b similar to the device 320a can be coupled to the pipe 305 which may feed the binder into the slurry mixer 304. Analyzing acoustic signal properties using the device 320b can reveal valuable information about the binder mixture being fed into the slurry mixer 304. In some examples, identifying any defects or concerns in the pipe 305 can be used as diagnostic information. For example, in a feedback mechanism, if inconsistencies are identified using the device 320b in the pipe 305, then the information can be used to rectify the inconsistency which may have originated in the binder tank 302. In another example, the inconsistencies may be reported to the slurry mixer 304 to adapt a mixing process (e.g., increase mixing time, mixing speed, mixing temperature, or other) to adjust to a binder having inconsistencies which was fed from the pipe 305 into the slurry mixer 304.

The slurry mixer 304 can include blades 308 for mixing the slurry. The slurry can include the binder, graphite, and/or other materials mixed with solvents such as water for anodes and N-Methyl-2-Pyrrolidone (NMP) for cathodes. The slurry obtained from the mixing is coated on current collectors to form electrodes. Since the slurry is highly viscous, proper coating is a complex and challenging process. As a result, electrode coatings can show significant differences in composition based on any defects in the slurry which may have been introduced in the slurry mixer 304. Detecting composition differences and accordingly fabricating batteries with more homogenous electrodes can lead to increased battery lifetime and reduce aging times.

Various aspects of the slurry mixer 304 can be controlled. A device 320c, similar to the devices 320a-b in their possible composition and deployment can be used for studying the acoustic signal behavior of various aspects of the slurry and the slurry mixer 304. This information can be may be used to control the slurry mixer 304 (e.g., adjusting any aspect of the speed/direction of the blades 308, temperature, composition of the slurry 306, or any other aspect). The slurry may be coated on to a current collector 310 using a pipe 307. In some examples, a pump 306 can control a flow rate of the slurry through the pipe 307.

A device 320d (similar to the devices 320a-c) can be used to monitor acoustic signal characteristics of the flow of the slurry through the pipe 307, and this information may be used as to monitor and assess the quality of slurry. Diagnostic information from the device 320c can also be used in any adjustments to the pipe 307 (e.g., to control the speed of the flow of slurry through the pipe 307).

For example, over the course of manufacturing, sedimentation or settling of the slurry may cause heavier particles to settle and lead to incomplete mixing such as resulting in regions of the slurry in the slurry mixer 304 having higher binder content or lower binder content. Such effects can result in changes to how the slurry gets deposited onto the coater through the pipe 307 to coat the slurry on to the current collector 310.

Monitoring one or more of the above components or related processes can inform the user of the coating quality in real-time and flag defects when they occur in the fabrication process flow. For example, monitoring one or more of the devices 320a-d can reveal information on potential adjustments to be made to the coating process where the slurry is deposited as electrode slurry 308 on to the current collector 310. For example, based on the binder, the slurry, conditions on the pipes 305-307, or other, can be used to control the coating process 309, such as guiding decisions on the thickness of the coating layer of the electrode slurry 308, speed at which the slurry is processed through the pipe 307 to be coated, width and uniformity of the coating, etc.

To deposit highly-uniform wet thin films, there are various solution-processing techniques capable of producing high-quality films. In some examples, the coating process 309 can include slot-die coating. Slot-die coating is a technique where solution is coated onto the substrate through a coating "head". Solution flows through the head at a determined rate and the substrate is moved underneath it. Slot-die coating can be a metered coating process. For example, the wet film thickness can be determined by the amount of solution placed onto the substrate. Other parameters can work to improve the uniformity and stability of the coating.

In other examples, the coating process 309 can include a doctor blading. Doctor blading (or knife coating or blade coating) is an example thin-film fabrication technique. Doctor Wading can involve running a blade over the substrate or moving a substrate underneath the blade. There is a small gap that determines how much solution can get through. The solution can be effectively spread over the substrate. The final thickness can be a fraction of the gap between the substrate and the blade. The final thickness of the wet film can be influenced by the viscoelastic properties of the solution and the speed of coating. Other example coating techniques are also contemplated herein such as, for example, dip coating, spin coating, bar coating, and the like.

One or more rollers 312 may be used to convey or move the current collector material through various components of electrode formation. For example, the rollers 312 can be used to move a thin sheet of the current collector 310 along a length direction such that the slurry can be deposited along a width direction through the pipe 307 on to the current collector 310. In some examples, a device 320e can be used for monitoring properties of the current collector and/or the deposited electrode slurry 308. In some examples, a device 320f may be embedded in or provided in one or more of the rollers 312 (or other devices such as a wedge, and/or possibly with a waveguide for focusing acoustic signals). The devices 320e-f can be similar to the devices 320a-d discussed above, and may be used for acoustic signal based monitoring of any portion of the electrode slurry 308/current collector 310. Rollers, current collectors, electrode slurry, sensing devices, and other aspects are further described in U.S. Provisional Patent Application No. 63/020,797, filed on May 6, 2020, entitled "ACOUSTIC SIGNAL BASED ANALYSIS OF FILMS FOR USE IN BATTERIES", the contents of which are hereby incorporated by reference in their entirety and for all purposes.

The electrode slurry 308/current collector 310 can be processed in a drying oven 314 for drying upon the coating process. The rollers 312 may convey the electrode slurry 308/current collector 310 through the drying processes. A device 320g can monitor the electrode slurry 308/current collector 310 through the drying process. The devices 320e-f can provide feedforward information based on the electrode slurry 308/current collector 310 being monitored to control the drying oven 314. For example, having determined a particular level of wetness, thickness, consistency, etc., based on the acoustic signal based analysis conducted using the devices 320e-f, an optimum drying time and temperature may be determined for the electrode slurry 308/current collector 310, and this information can be used to program settings for the drying oven 314. In some examples of coating and/or calendaring (see, e.g., process steps 204, 208) inconsistencies measured in the coating of the electrode slurry 308 can also be fed back to the slurry mixing or binder formation processes in addition to or as an alternative to adjusting the heating/drying phases.

Figure 4:
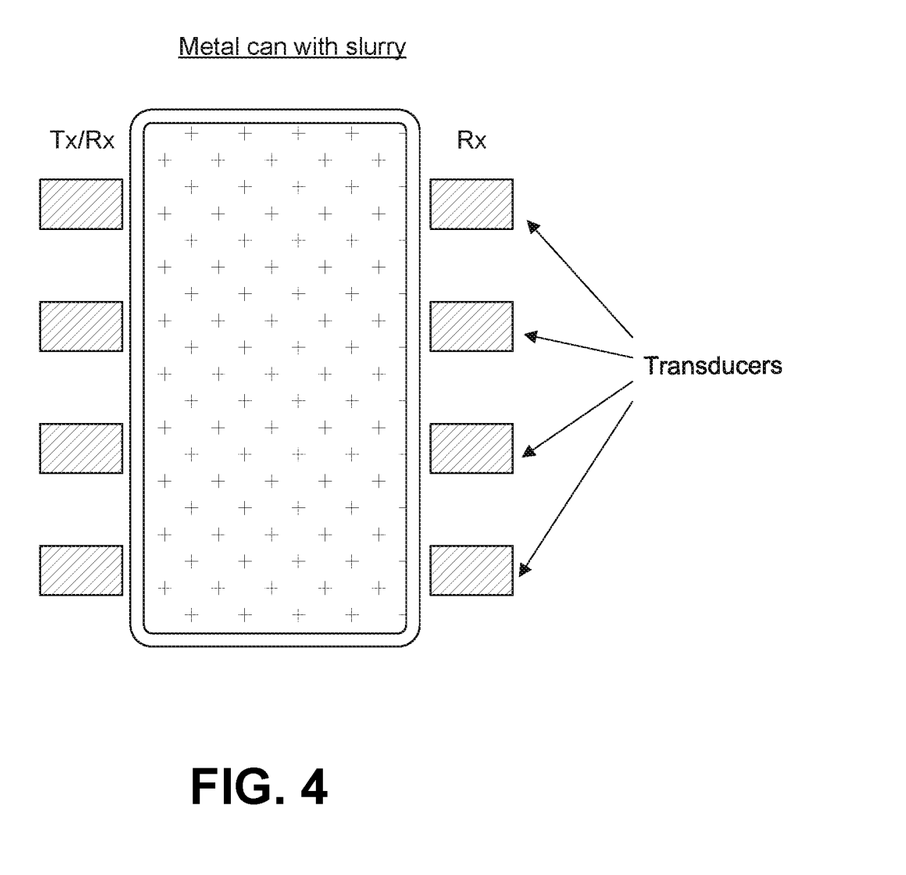
FIG. 4 illustrates the use of acoustic signal based analysis method to detect quality of slurry in a container or pipe, according to aspects of this disclosure.

FIG. 4 illustrates a section of a pipe or a case which is filled with a solid-liquid mixture such as binder or electrode slurry and monitored with one or more sensors using acoustic based analysis technique. Characteristics like binder dissolution quality, inconsistent solids percentage, agglomeration, slurry gelling, trapped air bubbles, density fluctuation can be monitored in a controlled environment to assess the quality of binder or slurry. The diagnostic information obtained can be compared to reference datasets to evaluate variations in the properties of the mixture.

Figure 5:
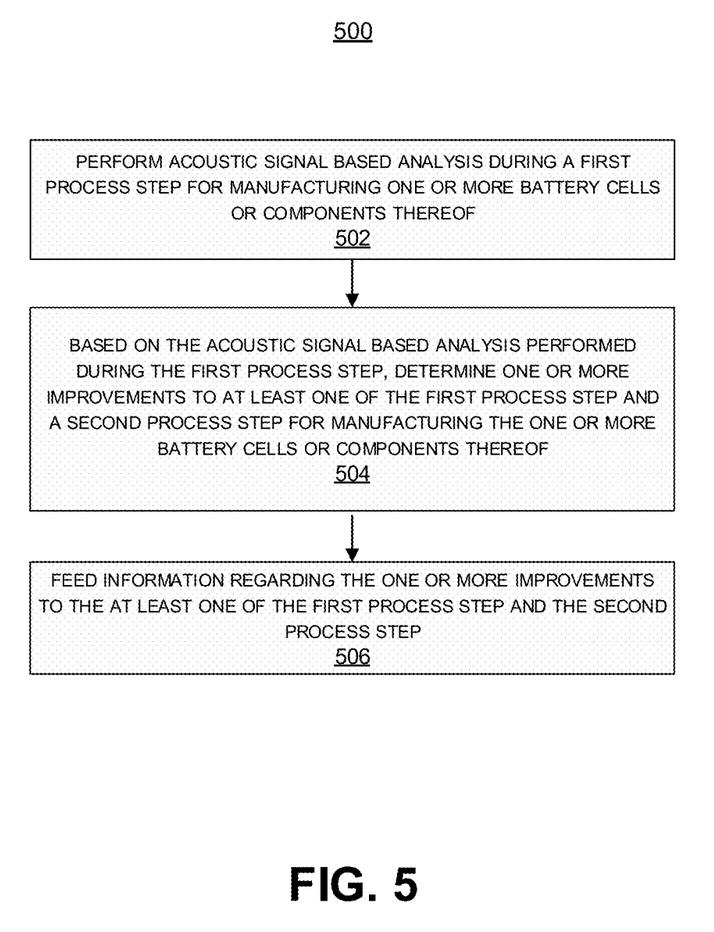
FIG. 5 is a flowchart illustrating an example method for manufacturing battery cells, in accordance with some aspects of the disclosure.

FIG. 5 is a flowchart illustrating an example method 500 for manufacturing battery cells. At block 502, the method 500 can include performing acoustic signal based analysis during a first process step for manufacturing one or more battery cells or components thereof At block 504, the method 500 can include based on the acoustic signal based analysis performed during the first process step, determining one or more improvements to at least one of the first process step and a second process step for manufacturing the one or more battery cells or components thereof.

At block 506, the method 500 can include feeding information regarding the one or more improvements to the at least one of the first process step and the second process step.

In some examples, the second process step can be prior to the first process step and feeding the information can include a feedback. In some examples, the second process step can be subsequent to the first process step and feeding the information can include a feedforward.

In some aspects, the one or more improvements can include one or more adjustments to at least one of heating or drying an electrode slurry and/or current collector, mixing a slurry, forming a binder, an operation of one or more rollers associated with the current collector, coating the slurry onto the current collector, a flow of the slurry through a pipe, control a slurry mixer, a flow of binder through a pipe, control a binder mixer, remove anomalous material detected, and/or a material composition of a binder and/or a slurry.

In some aspects, performing the acoustic signal based analysis can include measuring one or more features of at least one of the first process step, the second process step, the one or more battery cells, and one or more components of the one or more battery cells. In some examples, the one or more features can include at least one of one or more characteristics of a binder, one or more characteristics, of a pipe one or more characteristics of a slurry, one or more characteristics of a slurry mixer, one or more characteristics of a flow of slurry, one or more characteristics of a coating of the slurry, one or more characteristics of an electrode slurry, one or more characteristics of a current collector, and one or more settings of a drying oven.

In some examples, performing the acoustic signal based analysis can include determining one or more acoustic signal properties associated with one or more acoustic waves transmitted through at least one of the one or more cells, a portion of the one or more cells, one or more components of the one or more cells, and a portion of the one or more components of the one or more cells.

In some examples, performing the acoustic signal based analysis can include determining one or more acoustic signal properties associated with one or more acoustic waves reflected from at least one of the one or more cells, a portion of the one or more cells, one or more components of the one or more cells, and a portion of the one or more components of the one or more cells.

In some examples, the method 500 can include detecting one or more anomalies in a binder and/or slurry with acoustic analysis and providing actionable intelligence.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Accordingly, an aspect of the invention can include a computer-readable media embodying a method of improvements to one or more processes in the manufacturing of battery cells using acoustic signal based analysis. Accordingly, the invention is not limited to illustrated examples and any means for performing the functionality described herein are included in aspects of the invention.

In some examples, the process 500 (also referred to as method 500) may be performed by one or more computing devices or apparatuses. In one illustrative example, the process 500 can be performed by the electronic device 100 shown in FIG. 1. In some examples, the process 500 can be performed by one or more computing devices with the computing device architecture 600 shown in FIG. 6. In some cases, such a computing device or apparatus may include a processor, microprocessor, microcomputer, or other component of a device that is configured to carry out the steps of the process 500. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 500 is illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
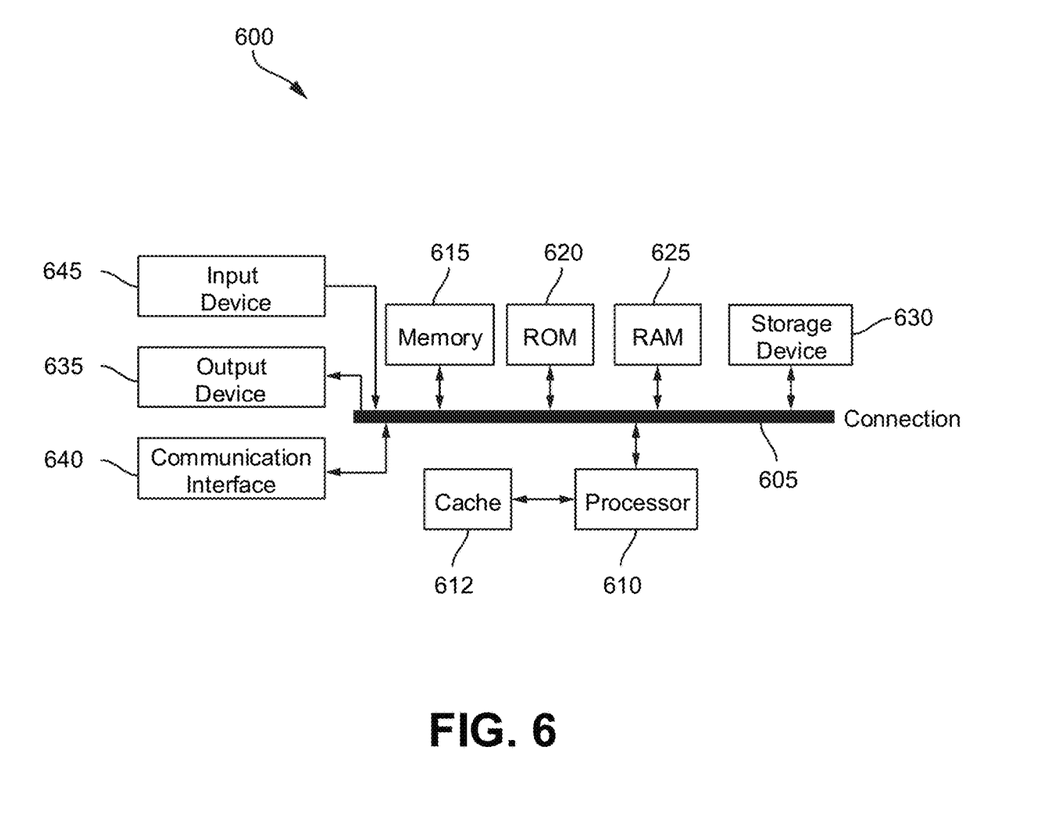
FIG. 6 illustrates an example computing device architecture of an example computing device, in accordance with some aspects of the disclosure.

FIG. 6 illustrates an example computing device architecture 600 of an example computing device which can implement various techniques described herein. For example, the computing device architecture 600 can implement at least some portions of the electronic device 100 shown in FIG. 1. The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics. The processor 610 can include any general-purpose processor and a hardware or software service stored in storage device 630 and configured to control the processor 610 as well as a special-purpose processor where software instructions are incorporated into the processor design. The processor 610 may be a selfcontained system, containing multiple cores or processors, a bus, memory controller, cache, etc. A multi-core processor may be symmetric or asymmetric.

To enable user interaction with the computing device architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art, such as a display, projector, television, speaker device. In some instances, multimodal computing devices can enable a user to provide multiple types of input to communicate with the computing device architecture 600. The communication interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include software, code, firmware, etc., for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of anon-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method of manufacturing battery cells, the method comprising: performing acoustic signal based analysis during a first process step for manufacturing one or more battery cells or components thereof and based on the acoustic signal based analysis performed during the first process step, determining one or more improvements to at least one of the first process step and a second process step for manufacturing the one or more battery cells or components thereof.

Aspect 2. The method of Aspect 1, wherein the second process step is prior to the first process step.

Aspect 3. The method of Aspect 2, wherein feeding the information comprises a feedback.

Aspect 4. The method of any of Aspects 1 to 3, wherein the one or more improvements comprise one or more adjustments to at least one of heating or drying an electrode slurry and/or a coated current collector, mixing a slurry, forming a binder, an operation of one or more rollers associated with the current collector, coating the slurry onto the current collector, a flow of the slurry through a pipe, control a slurry mixer, a flow of binder through a pipe, control a binder mixer, remove anomalous material detected, and a material composition of a binder and/or a slurry.

Aspect 5. The method of any of Aspects 1 to 4, wherein performing the acoustic signal based analysis comprises measuring one or more features of at least one of the first process step, the second process step, the one or more battery cells, and one or more components of the one or more battery cells.

Aspect 6. The method of Aspect 5, wherein the one or more features comprise at least one of one or more characteristics of a binder, one or more characteristics of a pipe, one or more characteristics of a slurry, one or more characteristics of a slurry mixer, one or more characteristics of a flow of slurry, one or more characteristics of a coating of the slurry, one or more characteristics of an electrode slurry, one or more characteristics of a current collector, and one or more settings of a drying oven.

Aspect 7. The method of any of Aspects 1 through 6, wherein performing the acoustic signal based analysis comprises determining one or more acoustic signal properties associated with one or more acoustic waves transmitted through at least one of the one or more cells, a portion of the one or more cells, one or more components of the one or more cells, and a portion of the one or more components of the one or more cells.

Aspect 8. The method of any of Aspects 1 through 7, wherein performing the acoustic signal based analysis comprises determining one or more acoustic signal properties associated with one or more acoustic waves reflected from at least one of the one or more cells, a portion of the one or more cells, one or more components of the one or more cells, and a portion of the one or more components of the one or more cells.

Aspect 9. The method of any of Aspects 1 through 8, further comprising feeding information regarding the one or more improvements to the at least one of the first process step and the second process step.

Aspect 10. The method of any of Aspects 1 or 3 to 9, wherein the second process step is subsequent to the first process step and feeding the information comprises a feedforward.

Aspect 11. A system comprising: one or more transducers configured to transmit acoustic signals through at least one of a portion of the one or more battery cells and a portion of one or more components of the one or more battery cells, and receive corresponding response signals associated with the acoustic signals; and one or more processors configured to: perform acoustic signal based analysis during a first process step for manufacturing the one or more battery cells or the one or more components; and based on the acoustic signal based analysis performed during the first process step, determine one or more improvements to at least a second process step for manufacturing the one or more battery cells or one or more components.

Aspect 12. The system of Aspect 11, wherein the second process step is prior to the first process step.

Aspect 13. The system of Aspect 12, wherein feeding the information comprises a feedback.

Aspect 14. The system of any of Aspects 11 to 13, wherein the one or more improvements comprise one or more adjustments to at least one of heating or drying an electrode slurry and/or current collector, mixing a slurry, forming a binder, an operation of one or more rollers associated with the current collector, coating the slurry onto the current collector, a flow of the slurry through a pipe, control a slurry mixer, a flow of binder through a pipe, control a binder mixer, remove anomalous material detected, and a material composition of a binder and/or a slurry.

Aspect 15. The system of any of Aspects 11 to 14, wherein performing the acoustic signal based analysis comprises measuring one or more features of at least one of the first process step, the second process step, the one or more battery cells, and the one or more components of the one or more battery cells.

Aspect 16. The system of Aspect 15, wherein the one or more features comprise at least one of one or more characteristics of a binder, one or more characteristics of a pipe, one or more characteristics of a slurry, one or more characteristics of a slurry mixer, one or more characteristics of a flow of slurry, one or more characteristics of a coating of the slurry, one or more characteristics of an electrode slurry, one or more characteristics of a current collector, and one or more settings of a drying oven.

Aspect 17. The system of any of Aspects 11 through 16, wherein performing the acoustic signal based analysis comprises determining one or more acoustic signal properties associated with one or more acoustic signals transmitted through at least one of the one or more cells, a portion of the one or more cells, the one or more components of the one or more cells, and a portion of the one or more components of the one or more cells.

Aspect 18. The system of any of Aspects 11 through 17, wherein performing the acoustic signal based analysis comprises determining one or more acoustic signal properties associated with one or more acoustic signals reflected from at least one of the one or more cells, a portion of the one or more cells, the one or more components of the one or more cells, and a portion of the one or more components of the one or more cells.

Aspect 19. The system of any of Aspects 11 through 18, further comprising at least one of a binder, a slurry, a container containing the binder, a container containing the slurry, a drying oven, and a pump configured to control a flow of binder and/or slurry through a pipe.

Aspect 20. The system of any of Aspects 11 through 19, the one or more processors being configured to feed information regarding the one or more improvements to the second process step.

Aspect 21. The system of Aspect 11 or any of Aspects 13 to 20, wherein the second process step is subsequent to the first process step and feeding the information comprises a feedforward.

Aspect 22. A non-transitory computer-readable medium having stored thereon instructions which, when executed by one or more processors, cause the one or more processors to perform a method according to any of Aspects 1 through 10.

Aspect 23. A system comprising means for performing a method according to any of Aspects 1 through 10.

What is claimed is:

1. A system comprising:
one or more transducers configured to transmit acoustic signals through at least one of a portion of one or more battery cells and a portion of one or more components of the one or more battery cells, and receive corresponding response signals associated with the acoustic signals;
and one or more processors configured to:
perform acoustic signal based analysis during a first process step for manufacturing the one or more battery cells or the one or more components; and
based on the acoustic signal based analysis performed during the first process step, adjust one or more parameters of at least a second process step for manufacturing the one or more battery cells or one or more components, wherein the parameters include heating or drying an electrode slurry and/or current collector, mixing a slurry, forming a binder, an operation of one or more rollers associated with the current collector, a flow of the slurry through a pipe, control a slurry mixer, a flow of binder through a pipe, control a binder mixer, remove anomalous material detected, and a material composition of a binder and/or a slurry.

2. The system of claim 1, wherein the one or more processors are further configured to feed information regarding the one or more parameters to the at least one of the first process step and the second process step, and the second process step is prior to the first process step and feeding the information comprises a feedback.

3. The system of claim 1, wherein the one or more processors are further configured to feed information regarding the one or more parameters to the at least one of the first process step and the second process step, and the second process step is subsequent to the first process step and feeding the information comprises a feedforward.

4. The system of claim 1, wherein performing the acoustic signal based analysis comprises measuring one or more features of at least one of the first process step, the second process step, the one or more battery cells, and the one or more components of the one or more battery cells.

5. The system of claim 4, wherein the one or more features comprise at least one of one or more characteristics of a binder, one or more characteristics of a pipe, one or more characteristics of a slurry, one or more characteristics of a slurry mixer, one or more characteristics of a flow of slurry, one or more characteristics of a coating of the slurry, one or more characteristics of an electrode slurry, one or more characteristics of a current collector, and one or more settings of a drying oven.

6. The system of claim 1, wherein performing the acoustic signal based analysis comprises determining one or more acoustic signal properties associated with one or more acoustic signals transmitted through at least one of the one or more battery cells, a portion of the one or more battery cells, the one or more components of the one or more battery cells, and a portion of the one or more components of the one or more battery cells.

7. The system of claim 1, wherein performing the acoustic signal based analysis comprises determining one or more acoustic signal properties associated with one or more acoustic signals reflected from at least one of the one or more battery cells, a portion of the one or more battery cells, the one or more components of the one or more battery cells, and a portion of the one or more components of the one or more battery cells.

8. The system of claim 1, further comprising at least one of a binder, a slurry, a container containing the binder, a container containing the slurry, a drying oven, and a pump configured to control a flow of binder and/or slurry through a pipe.

9. The system of claim 1, the one or more processors being configured to feed information regarding the one or more parameters to the second process step.

10. A system comprising:
one or more transducers configured to transmit acoustic signals through at least one of a portion of one or more battery cells and a portion of one or more components of the one or more battery cells, and receive corresponding response signals associated with the acoustic signals;
and one or more processors configured to:
perform acoustic signal based analysis during a first process step for manufacturing the one or more battery cells or the one or more components, wherein performing the acoustic signal based analysis comprises measuring one or more features of at least one of the first process step, a second process step, the one or more battery cells, and the one or more components of the one or more battery cells and the one or more features comprise at least one of one or more characteristics of a binder, one or more characteristics of a pipe, one or more characteristics of a slurry, one or more characteristics of a slurry mixer, one or more characteristics of a flow of slurry, one or more characteristics of a coating of the slurry, one or more characteristics of an electrode slurry, one or more characteristics of a current collector, and one or more settings of a drying oven; and
based on the acoustic signal based analysis performed during the first process step, determine one or more improvements to at least the second process step for manufacturing the one or more battery cells or one or more components, wherein the one or more improvements comprise one or more adjustments to at least one of heating or drying an electrode slurry and/or current collector, mixing a slurry, forming a binder, an operation of one or more rollers associated with the current collector, a flow of the slurry through a pipe, control a slurry mixer, a flow of binder through a pipe, control a binder mixer, remove anomalous material detected, and a material composition of a binder and/or a slurry.

11. The system of claim 10, wherein the one or more processors are further configured to feed information regarding the one or more improvements to the at least one of the first process step and the second process step, and the second process step is prior to the first process step and feeding the information comprises a feedback.

12. The system of claim 10, wherein the one or more processors are further configured to feed information regarding the one or more improvements to the at least one of the first process step and the second process step, and the second process step is subsequent to the first process step and feeding the information comprises a feedforward.

13. The system of claim 10, wherein performing the acoustic signal based analysis comprises determining one or more acoustic signal properties associated with one or more acoustic signals transmitted through at least one of the one or more battery cells, a portion of the one or more battery cells, the one or more components of the one or more battery cells, and a portion of the one or more components of the one or more battery cells.

14. The system of claim 10, wherein performing the acoustic signal based analysis comprises determining one or more acoustic signal properties associated with one or more acoustic signals reflected from at least one of the one or more battery cells, a portion of the one or more battery cells, the one or more components of the one or more battery cells, and a portion of the one or more components of the one or more battery cells.

15. The system of claim 10, further comprising at least one of a binder, a slurry, a container containing the binder, a container containing the slurry, a drying oven, and a pump configured to control a flow of binder and/or slurry through a pipe.

16. The system of claim 10, the one or more processors being configured to feed information regarding the one or more improvements to the second process step.

* * * * *